Patented Dec. 17, 1940

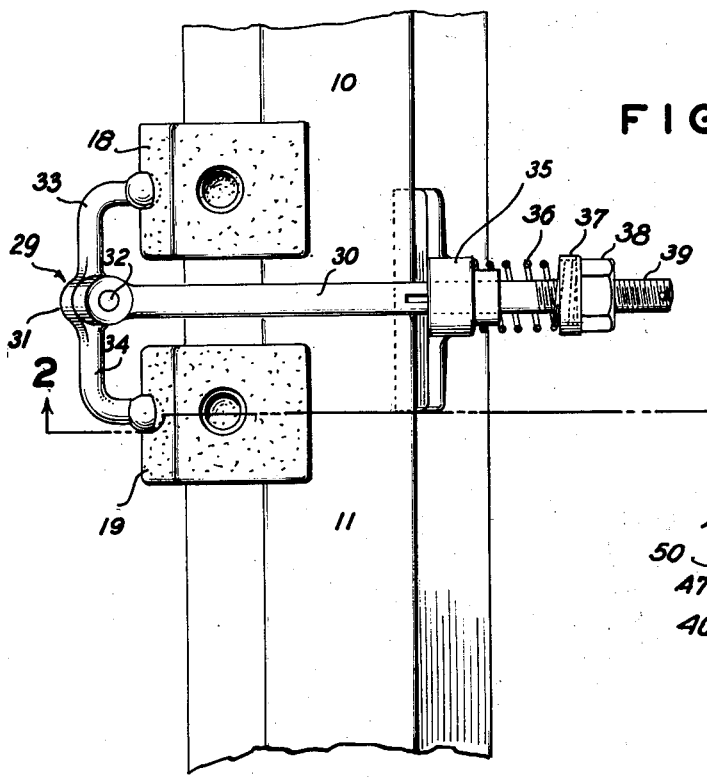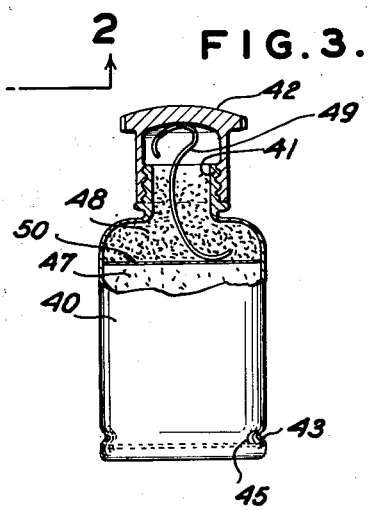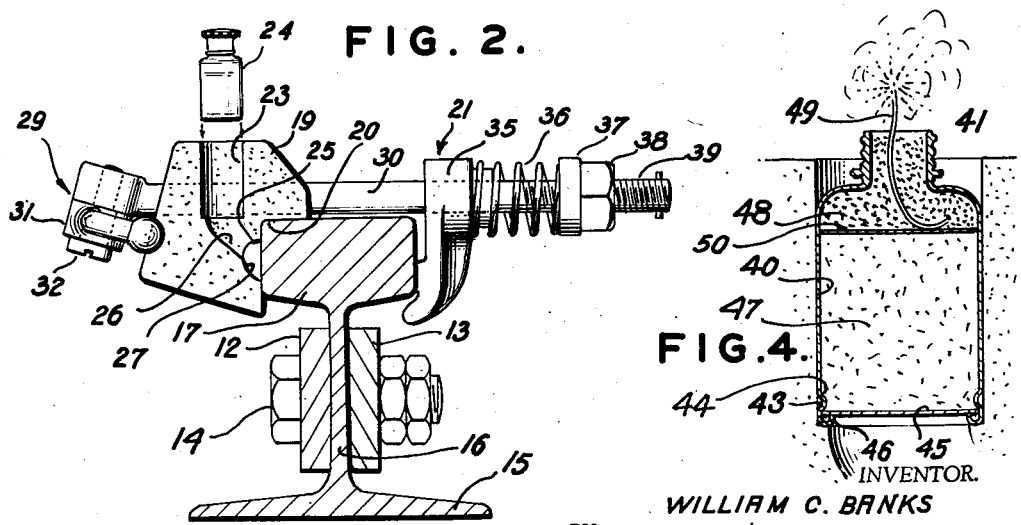

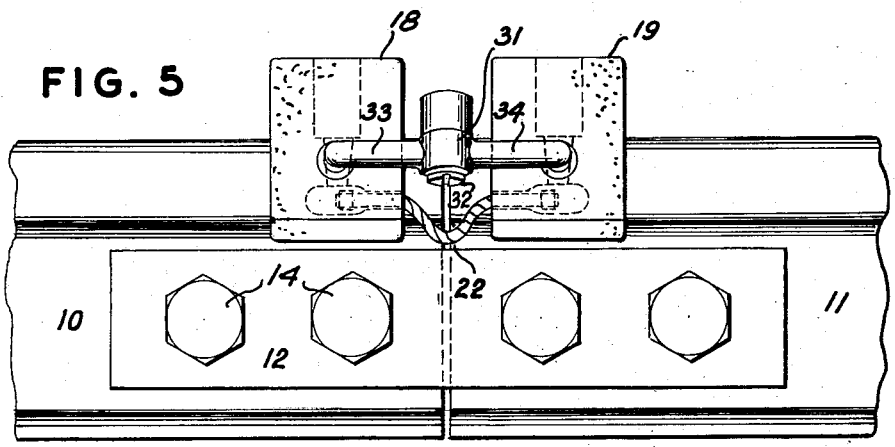
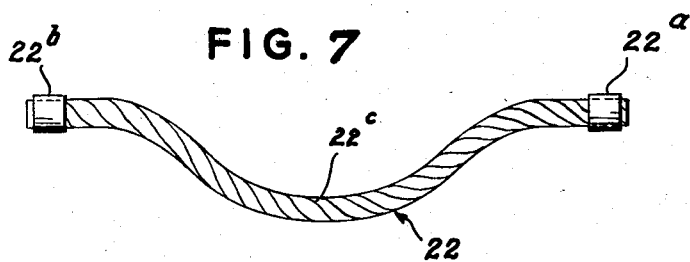
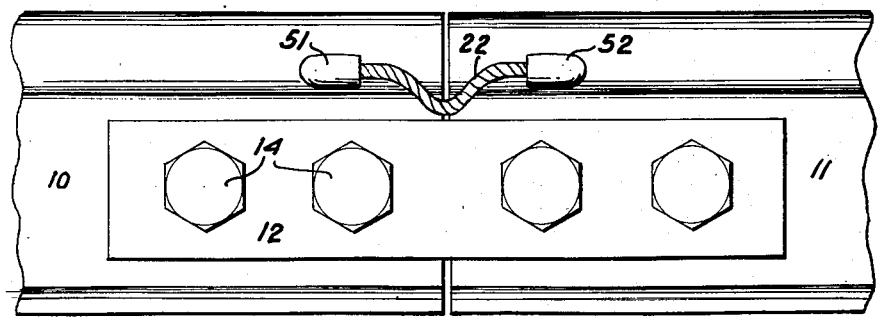

2,225,028

UNITED STATES PATENT OFFICE 2,225,028

WELDING CARTRIDGE

William C. Banks, Jersey City, N. J.

Application January 21, 1939, Serial No. 252,153

2 Claims. (Cl. 44—3)

This invention relates to devices for welding flexible connector elements such as an electric conducting cable element to a rigid sectional linear element such as a railroad rail. Electrical connector cables are commonly used to bridge the abutting ends of railroad rails to assure the continuity of the flow of electric current therethrough. The welding of the ends of these cable connectors to the rails has continued to present difficulties. Bulky welding apparatus for this purpose is commonly used. Some improvements therein have been made with the view to making them more readily portable by the workmen who must carry them from rail joint to rail joint for the purpose of making the welds of the cables that bridge the joints.

It has been proposed heretofore to make these welds by the use of powdered mixtures of the thermit type, held in a refractory crucible used to clamp each end of the connector cable to the face of its respective rail end section. The crucibles are held against the rail by a bulky and weighty clamping arrangement. The workman is expected to carry with him a cardboard carton of the powdered welding mixture. When the clamping arrangement is set up and holds two crucibles against abutting rail end sections with the connector cable ends between them and the rail, the workman removes the top of the carton and empties the contents thereof into a cavity in the crucible. He touches a match to a flash powder portion of the mixture which in turn ignites the mixture to cause chemical reaction, the result of which is the production of molten reduced metal that flows through a duct in the crucible to surround the cable end and weld it to the rail.

This invention revolves around a novel packaging of the welding mixture to be supplied to the crucible. Also to a novel type of clamp for fastening the crucible to the rail in welding position. The novel package comprises a waterproof cartridge in which is held in non-mixing relation the flash powder and the heat responsive and chemically reactive constituents. Also it contains fusee or igniting means in the cartridge, all sealed safely against displacement and moisture.

The object of this invention, therefore, is to provide an improved crucible clamping device; and also an improved composite charge of welding constituents in a cartridge that is substantially immune to disarrangement or to be rendered inoperative by moisture, while at the same time being easy of ignition.

According to one feature the bottom of the cartridge itself takes the place of a replaceable fusible temporary tin bottom in the crucible, such as heretofore in use.

According to another feature a temporary disintegratable septum separates the strata of the respective powders in the cartridge, to prevent their intermixing, and to insure positive ignition of the flash powder and prompt functioning of the subsequent effects or heat reactions in the welding powder below. A fusee may be pre-adjusted in the flash powder within the cartridge, and because of a suitable removable closure the contents of the cartridge are maintained at all times in a dry condition.

Other features relate to the construction of a holder for the crucibles and the cable element as applied to the rail.

According to one of a number of possible embodiments the cartridge is approximately bottle-shaped having a neck portion and a hermetically sealing screw cap therefor. Unscrewing the cap exposes the fusee for ignition. The bottom of the cartridge, being in the nature of a fusible metal disk, is applied to the cartridge body after the cartridge has been filled with the powders through the open bottom.

The invention possesses other objects and features of advantage, some of which, with the foregoing, will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

Fig. 1 is a plan view of a pair of crucibles and of a holder therefor as applied to adjoining end portions of a pair of rail sections.

Fig. 2 is a cross section along the line 2—2 of Fig. 1 with the additional showing of a cartridge being applied thereto.

Fig. 3 is a part-sectional enlarged detailed view of the cartridge per se with damp-proof closure applied thereto.

Fig. 4 is an enlarged longitudinal section of the cartridge as placed in the crucible and ready for ignition, the contents showing the flash powder above to be separated by a septum from the powdered welding mixture below.

Fig. 5 is a side view of the device including crucibles and holder, as well as the connector cable, as assembled upon the rail.

Fig. 6 is a side view of the finished weld of the connector cable on the rail.

Fig. 7 is a detail view of the connector cable.

A rail or rail profile of substantially standard shape is shown in Figs. 1 and 2, comprising the two adjoining butt ends of a pair of rail sections 10 and 11, connected by a pair of fish plates 12 and 13 with bolt and nut connections 14. The rail profile as usual consists of bottom flange 15, web 16 and head portion 17.

A pair of crucibles 18 and 19 of refractory material, for instance graphite, are shown to be applied to the head portion of the rail, and they are shaped to fit over, and engage upon an upper corner portion 20 of the rail head 17, and are held in place under resilient pressure by a holder 21.

The crucibles are symmetrically arranged in the sense that each will overlie and clamp to the rail face an end portion of a flexible metallic conductor or cable 22 placed laterally against the rail head face in a position for welding to the rails. The cable is shown to be of wire rope construction having armored end portions 22a and 22b and an intermediate loop portion 22c.

The crucible 18 has a cavity or socket 23 adapted to receive the welding charge in form of a cartridge 24, the details of which will be described below. A shoulder 25 at the bottom of the socket serves for the seating of the cartridge. A duct 26 in the crucible extends obliquely downward from the socket 25 into a molding recess 27 formed laterally in the crucible and adapted to receive one end portion 22a of the cable element. This molding recess provides a suitable amount of clearance around the cable end to permit molten welding metal from the socket 23 of the crucible to flow through the duct 26 into the molding recess 27. In this way the end portion of the cable element is embedded in the metal and welded to the head portion 17 of the rail.

The same process, of course, takes place in the welding of the other end portion of the cable element with the aid of the crucible 19.

The crucible holder 21 comprises a T-shaped portion 29 having a stem portion 30, and a transverse portion 31 pivotally connected at 32 with the one end of the stem portion 30. Inasmuch as this stem portion 30 extends horizontally between the crucibles 18 and 19 across the rail, the end portions 33 and 34 respectively of the transverse portion 31 of the holder are adapted to engage upon and to hold the crucibles 18 and 19 in operating position against the rail head 17.

The opposite end of the stem portion 30 of the crucible holder carries slidably mounted thereon a jaw portion 35 adapted to engage the head portion 17 of the rail opposite the crucibles. A compression coil spring 36 surrounding the stem portion 30 is confined between the jaw portion 35 and a collar 37 backed by a nut 38 which is screwed upon the threaded end portion 39 of the stem portion 30. In this way the jaw portion 35 is held under adjustably resilient pressure.

The cartridge as shown in the enlarged views of Figs. 3 and 4 respectively, comprises, for example, a bottle shaped housing or body portion 40 having a threaded neck portion 41 and a screw cap 42 therefor and adapted to make a hermetical seal therewith. The lower end of the body portion of the cartridge is shown to be provided with a slight circumferential constriction 43 providing an inner ledge to make an annular seat 44 for a bottom or disk 45 of the cartridge, which bottom is held tightly in place by way of an inwardly crimped lower edge portion 46 of the cartridge housing, the bottom or disk 45 being of fusible metal and adapted to melt when exothermic reaction of the cartridge contents has produced the heat intensity desired.

Occupying the lower portion of the cartridge is the powdered welding material or metal 47 proper, while the upper portion is occupied by the flash powder 48 having inserted in it a fusee 49 ready for ignition. Both powders 47 and 48, that is to say, the primary or flashing powder, and the secondary or welding powder are kept mechanically separated by a heat-destroyable or distintegratable septum which may, for instance, be in the nature of a Celluloid disk 50.

The operation is as follows:

The fusee ignites the flash powder; the flash powder in burning disintegrates the septum and raises the welding mixture to reaction temperature. At reaction temperature, the metallic oxides are reduced and molten metal melting the disk flows through the duct in the crucible to the recess surrounding the cable end, which end the molten melt surrounds and welds to the rail face.

More in particular, the respective end portions 22a and 22b respectively of the cable element are applied to the corresponding adjoining end portions of a pair of rail sections, incident to the placing of the crucibles 18 and 19 upon the rail head 17, as the crucible holder 21 is applied to complete the operating assembly substantially as shown in Figs. 1, 2 and 5. The cartridge 26 containing the welding powder or powders in proper predetermined quantity and proportion, is then placed in the socket 23 of a crucible, after the screw cap 42 has been removed and the fusee 49 adjusted for ignition. Upon lighting the fusee (see Fig. 4) the flash powder 48 will react and develop the heat necessary for initiating the exothermic reactions in the secondary or welding powder 47, the latter being composed, for instance, of a mixture of "thermit," a metallic oxide such as copper oxide, and aluminum, while the flash powder comprises substantially magnesium.

The Celluloid septum 50, of course, having served its purpose of maintaining the respective powders in operating condition relative to one another, succumbs and is destroyed or burned and the metal in fusion resulting from the exothermic reaction of the welding powder is held in the crucible until this reaction reaches its highest temperature, at which time the fusible bottom or disk 45 also succumbs and fuses, thereby permitting the fused welding metal to drop through the duct 26 into the molding recess 27 where it impinges against the rail head, embedding the respective end of the cable element 22. The surface of the rail head, of course, has been scraped or cleaned at the point of welding prior to adjusting the device thereto.

After both end portions of the cable element 22 have thus been welded to their respective rail head portions, the finished connection appears as in Fig. 6 showing respective welds 51 and 52 as they have been shaped by the molds in the crucibles 18 and 19 respectively, and also showing the downwardly looped portion 22c of the bond element affording sufficient reserve length at a minimum of total cable length required, the end to end distance of the cable element being such as to afford ample broken rail protection.

Whereas, the invention has been described in an embodiment wherein a cable connector is welded to abutting end sections of two railroad rails, obviously, other embodiments are possible where copper bearing electrical connectors are welded to other things than rails.

I claim:

1. A cartridge comprising a casing having a heat destroyable bottom portion, a powdered welding material in the nature of a mixture capable of chemical reaction to yield therefrom the molten welding metal, a powdered flashing material capable when ignited of inducing said chemical reaction in said welding material, and a heat-destroyable dividing element which is separate from and inseparable into said casing for keeping separate said powdered welding material and said powdered flashing material.

2. A cartridge according to claim 1, in which the dividing element is a disc of Celluloid material.

WILLIAM C. BANKS.